Sept. 8, 1959  W. MEFFERT  2,903,494
ELECTRODE ATTACHING DEVICE FOR ELECTRIC ARC FURNACES
Filed Feb. 24, 1958
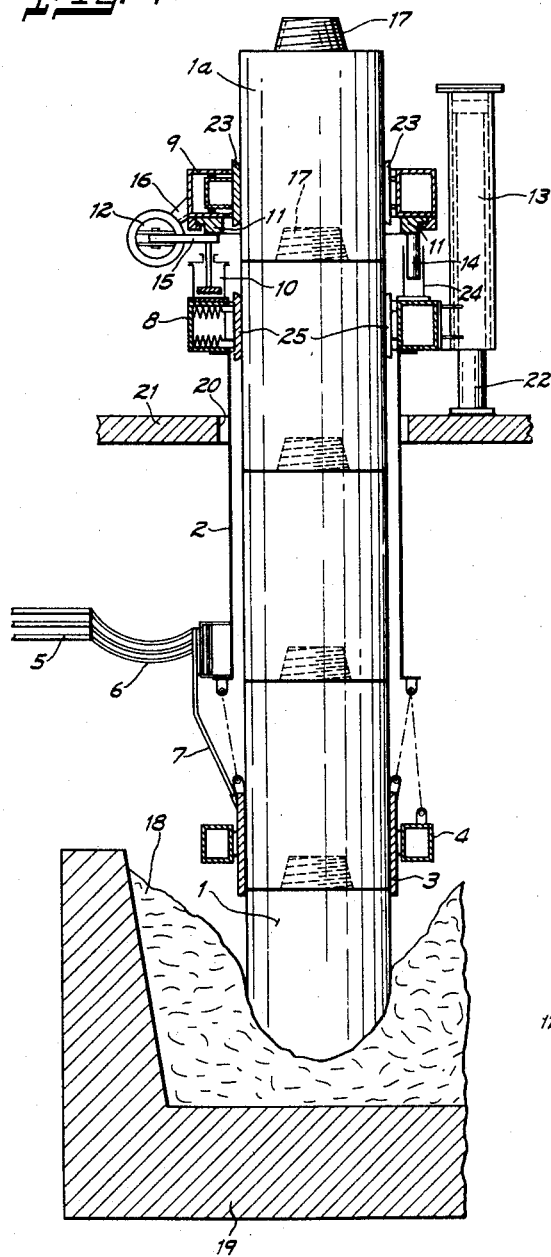
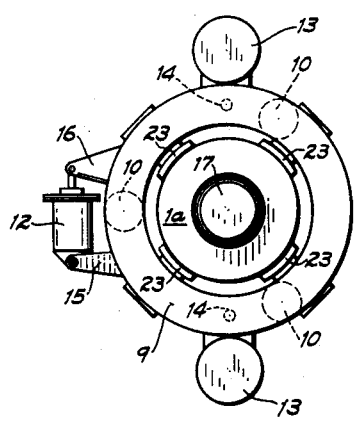
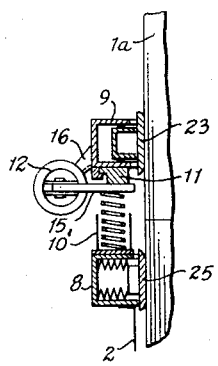
INVENTOR.
Walter Meffert
BY Ralph G. Hohenfeldt
Attorney United States Patent Office 2,903,494
Patented Sept. 8, 1959

2,903,494

ELECTRODE ATTACHING DEVICE FOR ELECTRIC ARC FURNACES

Walter Meffert, Duisburg-Buchholz, Germany, assignor to Demag-Elektrometallurgie G.m.b.H., Duisburg, Germany, a corporation of Germany Application February 24, 1958, Serial No. 717,057

Claims priority, application Germany February 23, 1957

3 Claims. (Cl. 13—14)

This invention relates generally to electric arc furnaces and, more particularly, to the means for replenishing the electrode while the furnace is operating.

It is customary in the trade to supply carbon or graphite furnace electrodes in lengths of 1 to 2 meters which may be assembled end-to-end to form an electrode of sufficient length to carry on melting operation in an electric furnace. Each such electrode piece ordinarily has an extending thread and adjacent shoulder which respectively screw in to a corresponding hole and shoulder at the opposite end of the piece to be attached, and in order to effect good electrical conductivity between the pieces, a suitable bonding cement is first applied to the threads and shoulders.

For small diameter electrodes, no serious problem is presented when it is desired to screw additional sections onto the main body for this operation may be carried on by men using simple tools to screw the sections together. For larger diameter electrodes, that is, in excess of 70 centimeters, it is difficult to attach additional electrode sections since the work must be done on top of a hot furnace and the tools necessary to do the job are proportionately large and unwieldy. Moreover, under such circumstances it is necessary to deenergize the furnace and temporarily suspend the melting operation.

Accordingly, it is a primary object of this invention to mechanize the operation of screwing additional electrode sections on a furnace electrode and to facilitate doing this without disconnecting the furnace.

A further object is to provide means for permitting the electrode to be regulated in response to furnace conditions while a new section is being added to the existing electrode.

In general terms, the invention comprises an electrode which extends through a horizontal supporting partition member and into a crucible in which the melting operation is carried on. According to the invention as illustrated, current is brought from a power source to the electrode by means of flexible cables which attach to suitable clamps that effect a tight but slidable grip on the electrode body beneath the supporting partition. The lower assembly just mentioned is provided with a sleeve that extends above the supporting partition and engages a holding ring at its upper end. This holding ring, which will hereinafter be called an intermediate holding ring, is provided with clamping shoes that permit the electrode to slide therethrough under certain circumstances. The intermediate ring is supported on a hydraulic regulator which raises and lowers the electrode in response to current and voltage conditions in the furnace. The intermediate ring just alluded to is surmounted by a topmost ring that is also provided with clamping jaws and which ring is expandable to enlarge the space between the shoes for admitting a new electrode section between them. The topmost ring is capable of being clamped, rotated in a thread screwing direction, released, and backed up so that another grip can be taken to enable a step-by-step rotation of the added electrode section.

The invention will now be described in greater detail in connection with the drawing in which:

Fig. 1 is an elevational view, partially in section, of an electric furnace including an electrode to which new sections may be added by the electrode holding and advancing apparatus constituting the invention;

Fig. 2 is a plan view of the topmost electrode clamping ring; and,

Fig. 3 is a fragmentary section through an alternate embodiment of a portion of the electrode holding and advancing apparatus.

Fig. 1 shows a furnace electrode 1 composed of a number of short sections which are screwed end-to-end on each other. It is understood that the lower end of the electrode effects an arc or directly conducts current to a melt 18 that is contained within a crucible 19, for example. A preferred path for feeding current to electrode 1 from a high capacity bus 5 consists in flexible cable 6, conductive tubes 7, and lower contact jaws 3. Contact jaws 3 must effect good electrical connections with electrode 1, but they must be capable of allowing the electrode to slide through them under its own weight or under the influence of the means which regulate the electrode vertically. For this purpose, jaws 3 are surrounded by a clamping member 4 which is merely symbolized but will be understood to be capable of exerting a suitable pressing force against jaws 3.

Electrode 1 is surrounded by a sleeve 2 or other suitable means extending through a clearance opening 20 in horizontal support partition 21.

Sleeve 2 terminates at its upper end in attachment to an intermediate ring member 8 which is in turn fixed to a pair of vertically disposed cylindrical members 13 constituting a part of the apparatus for regulating the electrode position in response to furnace conditions.

Although some parts are omitted, it will be understood by those versed in the art that cylinders 13 may be filled with hydraulic fluid which in response to pressure variations will raise the cylinders by reacting against stationary posts 22 bearing on member 21.

Axially spaced and above intermediate holding ring 8 there is provided an annular assembly for engaging a new electrode section 1a and screwing the same onto the operating electrode below it. This annular assembly includes a ring 9 carrying clamping jaws 23, which are capable of alternately clamping and unclamping electrode section 1a, a guide ring 11, on which ring 9 rotates, and which is itself prevented from rotating by means of a socket 24 which is fixed to ring 8 and which telescopically receives a stud 14 extending downwardly from ring 11. Guide ring 11, which supports ring 9, is in turn slidably supported on fluid-operated servo-motors 10 mounted on intermediate ring 8. As shown in Fig. 3, springs 10' can also be substituted for servo-motors 10 as shown in Fig. 3 for it will be seen from the description below that when a new section 1a is added, the whole electrode 1 settles and would compress the springs 10' against intermediate ring 8. Reference character 10' has been used on Fig. 3 to show the springs, as they are equivalent to the servo-motor. When the upper clamping ring 9 is again released to take a new grip on added section 1a, the springs 10' would lift the whole assembly 9 to a new axial position on the added section 1a.

Upper ring 9 is rotated by a pneumatic or hydraulic fluid motor assembly 12 which is provided with an arm 15 that is permanently attached to ring 11. The other end of the fluid operator 12 is attached to an arm 16 which is permanently connected to a ring section 9. Clamping jaws 23 are initially in the open position for inserting a new section 1a which is added by means of a threaded nipple 17 to the electrode body 1 below. Clamps 23 are then engaged with the periphery of new section 1a and fluid is admitted to operator 12 so that arm 16 is caused to execute a partial clockwise revolution as viewed in Fig. 2. By this process, threaded engagement of electrode 1 and section 1a is begun. After one such step is taken, clamps 23 are released and fluid is applied to operator 12 in such way that arm 16 returns in a counterclockwise direction to its original position. Section 1a is then reclamped and operator 12 is again caused to repeat the turning operation outlined above. Ultimately the new section 1a will be turned tightly against the electrode body 1 in a step-by-step manner. During this time, of course, ring 9 and its fixed guide ring 11 will be advancing axially toward intermediate ring 8 as stud 14 telescopes in tube 24 and as servo-motor lifting device 10 yields.

After termination of the operation described above, clamping ring 9 is again loosened and moved upwardly under the influence of servo-motor 10 so that when the upper end of the electrode 1 is fed downwardly through jaws 23 while it is being consumed at its lower end, the space between upper clamping jaws 23 will finally become unoccupied and ready for insertion of a new electrode section 1a. During the interim between adding electrode sections and when the furnace is operating normally, regulator 13 is able to control electrode 1 by reason of the grip which it exerts on the electrode through the agency of intermediate clamps 25 and further through lifting force transmitted through sleeve 2 on the lower electrode clamping ring 4. The regulator movements of the electrode are not interfered with while screwing on a new section 1a because intermediate ring 8 and topmost ring 9 raise and lower simultaneously.

It is claimed:

1. Apparatus for screwing a new electrode section on an electric furnace electrode comprising an electrode embracing and holding means, regulating drive means operatively engaged with said electrode embracing and holding means, upper electrode engaging clamp means arranged above said electrode embracing and holding means, a drive means for rotating said upper electrode engaging clamp means partially around the electrode when it is clamped to the electrode and for returning the upper electrode engaging clamp means to its original angular position when it is disengaged, whereby the new electrode section can be screwed on the electrode in a step-by-step manner.

2. The invention according to claim 1 including a guide ring means to support for rotation said upper electrode engaging clamp means and means to secure said guide ring means against rotation with respect to said holding means.

3. The invention according to claim 2 wherein the drive means comprises a fluid motor having a part fixed to the guide ring means and another part attached to the upper electrode engaging clamp means for effecting reversible rotation of the latter with respect to the electrode section when said clamping means are alternately engaged and disengaged.

References Cited in the file of this patent
UNITED STATES PATENTS

| | | |
|---|---|---|
| 1,892,109 | Marshall | Dec. 27, 1932 |
| 2,297,484 | Lehrer et al. | Sept. 29, 1942 |
| 2,458,272 | Jones | Jan. 4, 1949 |
| 2,668,183 | Foyn | Feb. 2, 1954 |
| 2,778,865 | Kongsgaarden | Jan. 22, 1957 |